US008827115B1

United States Patent
Katz

(10) Patent No.: US 8,827,115 B1
(45) Date of Patent: Sep. 9, 2014

(54) CONTAINER FOR STORING, MEASURING AND DISPENSING A LIQUID

(71) Applicant: Victor Katz, Silver Spring, MD (US)

(72) Inventor: Victor Katz, Silver Spring, MD (US)

( * ) Notice: Subject to any disclaimer, the term of this patent is extended or adjusted under 35 U.S.C. 154(b) by 0 days.

(21) Appl. No.: 14/246,580

(22) Filed: Apr. 7, 2014

(51) Int. Cl.
*B67D 7/56* (2010.01)
*G01F 11/08* (2006.01)
*B65D 83/00* (2006.01)
*G01F 13/00* (2006.01)

(52) U.S. Cl.
CPC .............. *G01F 11/08* (2013.01); *G01F 13/005* (2013.01); *B65D 83/0027* (2013.01)
USPC .......................................... 222/158; 222/390

(58) Field of Classification Search
CPC ........... B65D 83/0011; B65D 83/0033; B65D 83/0027; G01F 13/005; G01F 11/08; G01F 11/021; G01F 11/082; G01F 11/024; G01F 11/026; G01F 11/288; B05C 17/0123
USPC ...................... 222/154–159, 390, 391, 465.1, 222/472–474
See application file for complete search history.

(56) References Cited

U.S. PATENT DOCUMENTS

| 1,051,609 | A | * | 1/1913 | McClung | 184/38.4 |
|---|---|---|---|---|---|
| 2,080,343 | A | * | 5/1937 | Smith | 222/387 |
| 2,445,101 | A | | 11/1948 | Bailey | |
| 2,789,737 | A | * | 4/1957 | Palo | 222/326 |
| 3,007,611 | A | * | 11/1961 | Coolidge | 222/137 |
| 3,977,574 | A | * | 8/1976 | Thomas | 222/391 |
| 4,643,337 | A | * | 2/1987 | Heck et al. | 222/214 |
| 5,292,039 | A | | 3/1994 | Neofitou | |
| 6,026,985 | A | | 2/2000 | Elliott, Sr. | |
| 6,877,639 | B1 | | 4/2005 | Hanson | |
| 6,945,014 | B1 | | 9/2005 | Quann | |
| 7,325,707 | B2 | * | 2/2008 | Bougamont et al. | 222/390 |
| 8,079,499 | B2 | * | 12/2011 | Juteau et al. | 222/390 |
| 8,434,647 | B2 | | 5/2013 | Aamar | |

* cited by examiner

*Primary Examiner* — Lien Ngo
(74) *Attorney, Agent, or Firm* — Oliver & Grimsley, LLC; Larry J. Guffey

(57) ABSTRACT

A liquid storage container also having liquid measuring and dispensing capabilities includes: (a) a two-part, rotatable, threaded rod mounted on the container's longitudinal axis, (b) a disc diaphragm that cooperates with the rotation of the threaded rod to move the disc to a height in the container such that the volume of liquid beneath it is that which is to be dispensed, and (c) a coronal plane post which is slidably mounted to move up and down between the rod's two parts and by such action allows the liquid below the diaphragm to be dispensed from an orifice in the bottom of the container while air from the environment surrounding the bottom of the container is allowed to flow up a passageway in the coronal post and into a region of the container that above the level of the liquid in the container.

20 Claims, 5 Drawing Sheets

CONTAINER FOR STORING, MEASURING AND DISPENSING A LIQUID

BACKGROUND OF THE INVENTION

1. Field of the Invention

The present invention generally relates to liquid dispensing devices. More specifically, the present invention relates to an improved household device for storing, measuring and then dispensing, using only gravitational forces, a user-selected, specific volume of liquid.

2. Description of the Related Art

In following a cooking recipe, it is often important to measure a precise amount of liquid (e.g., cooking oil) for subsequent dispensing. The most commonly used method in cooking of measuring an amount of liquid and then dispensing it is to use a measuring cup. However, this method is widely recognized as having certain disadvantages: (a) it can be a time consuming task since it requires the use of a measuring cup that has gradations relating to different volume measurements of liquid (i.e., ¼ cup, ½ cup, etc.), (b) the manner of measuring the liquid can be imprecise in that the user pours liquid from a base stock or storage container into the measuring cup until the meniscus of the liquid reaches the target gradation; as most will be familiar with, it is difficult to precisely obtain the target amount of liquid since a pour or successive pours from the stock container often results in either too little or too great an amount of liquid being transferred into the measuring cup, (c) it often occurs that one needs to reuse a certain measuring cup and, therefore, has to stop and wash it—a time consuming, and menial task that can reduce the grandeur of cooking, and (d) sometimes, the proper size measuring cup is nowhere to be found in one's kitchen.

It would be very useful if the household, storage containers for liquids could be modified to incorporate their own measuring and dispensing components. Several attempts have been made to design, fabricate and bring to market various such modified containers or the additional components that they would need to incorporate in order to enable such modified containers to store, measure and dispense liquids. See, for example, U.S. Pat. Nos. 8,434,647, 6,945,014, 6,877,639, 6,026,985, 5,292,039 and 2,445,101.

Despite these prior efforts, such modified containers have had certain limitations or problems that have resulted in their not achieving widespread use. The present invention provides an improved, household container for storing, measuring and then dispensing liquids.

SUMMARY OF THE INVENTION

Recognizing the need for an improved, household container for storing, measuring and then dispensing liquids, the present invention is generally directed towards this end.

A preferred embodiment of the present invention is an improved, modified liquid storage container that is also capable of measuring and dispensing a user-selected, specific volume of the liquid. The liquid storage container is of the typical hollow, right-circular cylinder or canister with a hinged lid that opens to allow liquid to enter through the open top of the cylinder. The bottom end of the cylinder is modified to include a liquid dispensing orifice situated on the longitudinal axis of the cylinder.

To enable this container to also have liquid measuring and dispensing capabilities, the modifications to it include:

(a) a two part, approximately-semicircular-shaped threaded rod which is mounted on this cylinder's longitudinal axis by a detachable handle which extends indirectly from the rod's top end and passes through a hole that is centered in the lid, (b) a moveable up-and-down, disc diaphragm which is sized such that its outer rim surface is proximate the inner surface of the cylinder; this diaphragm is situated in the cylinder and oriented perpendicular to the cylinder's longitudinal axis; it has a center orifice through which the threaded rod passes and about which the diaphragm is connected to the threaded rod in such a way that clockwise and counter-clockwise rotation of the rod's handle causes the diaphragm to move, respectively, up and down along the cylinder's longitudinal axis so as to set the height of this diaphragm within the cylinder such that the volume below it is equivalent to that of the liquid which is to be dispensed; this disc diaphragm consists actually of longitudinally-spaced-apart top and bottom discs and a compressible intermediate disc member whose rim surface expands radially outward when the intermediate disc member is compressed so as to come into contact with the interior surface of the cylinder so as to provide a temporary, liquid-tight seal between disc diaphragm and the cylinder's inner surface, (c) a coronal plane post having anterior and posterior planar surfaces, two concave shaped edges and top and bottom ends, which is configured to fit between and be slideably up-and-down mounted between the flat surfaces of the two approximately-semicircular-shaped parts of the threaded rod and sized so that the combination of these pieces has a circular circumference; it is this post's top end that connects directly with this apparatus' handle; from the post's bottom end extends an open & closeable hollow tube whose length is such that its distal end passes through the cylinder's liquid dispensing orifice and into the ambient environment surrounding the cylinder; this hollow tube and the extensions of it, which extend throughout the combination of the coronal plane post and two threaded rod parts, have a configuration adapted to allow air in the environment surrounding the tube's distal end to enter and temporarily flow through the combination when liquid is being dispensed—thereby allowing the liquid to flow better from the container than it would if the container was otherwise vapor locked, (d) a stopper affixed to the hollow tube's exterior surface has a configuration adapted to plug the container's liquid dispensing orifice except when the coronal plane post is caused to move upward to unplug this orifice and allow a measured quantity of liquid to be dispensed, and (e) a thumb trigger attached to the lid that has a configuration adapted to raise the coronal plane post and its attached stopper up so as to allow the volume of liquid below the disc diaphragm to be dispensed, and then to lower it so as to re-plug the cylinder's dispensing orifice when this desired volume of liquid has been dispensed.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Figure 1:
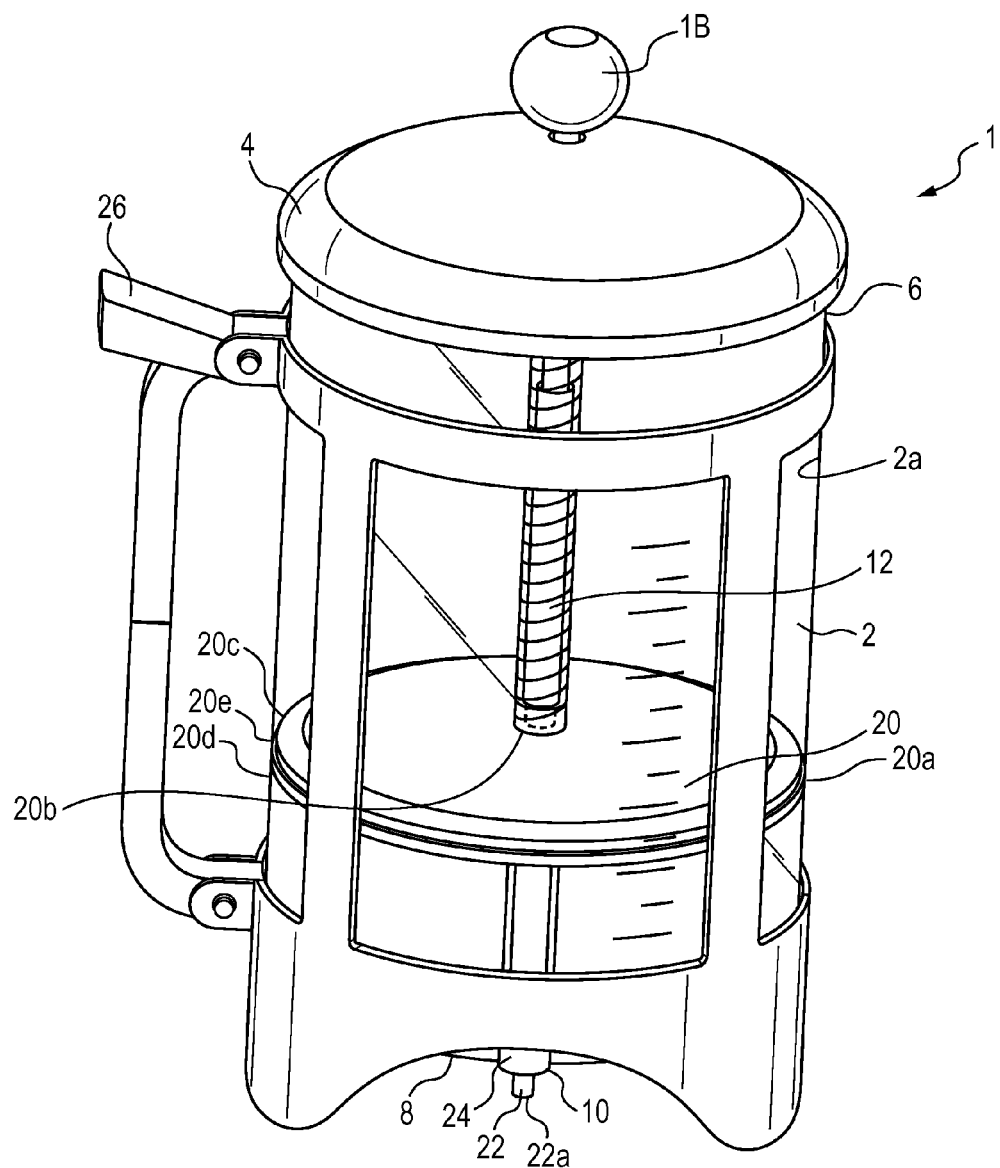
FIG. 1 is a perspective view of a preferred embodiment of the present invention.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The present invention 1 is an improved, household container for storing, measuring and then dispensing liquids. Its basic liquid storage capability is provided by the typical hollow, right-circular canister or cylinder 2 with a hinged lid 4 that opens to allow liquid to enter through the open top 6 of the cylinder. The bottom end 8 of this cylinder is modified to include a liquid dispensing orifice 10 situated on the longitudinal axis of the cylinder. See FIG. 1.

A two part, approximately-semicircular-shaped threaded rod 12 encloses a coronal plane post 14, which are referred to collectively as a multi-part, threaded rod combination. The threaded rod is slidably mounted to move up and down through the two parts of the threaded rod. The rod is rotatably mounted on this cylinder's longitudinal axis by the use of a plank 16 which extends across the cylinder's open end. The rod engages at its top end with the shaft of a disengageable handle 18 which is located above the lid 4 and used to rotate the threaded rod.

Rotation of the threaded rod 12 causes a disc diaphragm 20 that is connected to the rod to move vertically up and down within the cylinder. This diaphragm is sized such that its outer rim surface 20a is proximate the inner surface 2a of the cylinder. A center orifice 20b in this diaphragm allows the threaded rod 12 to be connected with the diaphragm in such a way that clockwise and counter-clockwise rotation of the rod's handle or crank mechanism 18 causes the diaphragm to move, respectively, up and down along the cylinder's longitudinal axis so as to set the height of this diaphragm above the cylinder's bottom end, such that the cylinder volume below the diaphragm is equivalent to that of the liquid which is to be dispensed.

Meanwhile, this disc diaphragm 20 consists of longitudinally-spaced-apart top 20c and bottom 20d discs and a compressible intermediate disc member 20e whose rim surface expands radially outward when the intermediate disc member is compressed so as to come into contact with the interior surface 2a of the cylinder so as to provide a temporary, liquid-tight seal between the disc diaphragm and the cylinder's inner surface.

The upward movement of the coronal plane post 14 within its surrounding threaded rod parts causes three key actions:

(a) since this post is connected to the bottom disc 20d, while the top disc 20c is connected to a now stationary threaded rod 12, the compressible intermediate disc member 20e is compressed and its rim surface expands radially outward to contact the cylinder's inner surface 2a—thereby providing a liquid-tight seal, (b) since the post's bottom end 14a has extending from it a hollow tube 22 whose length is such that its distal end 22a passes through the cylinder's liquid dispensing orifice 10 and into the ambient environment surrounding the cylinder; and the tube's top end 22b has extensions of it which extend throughout the longitudinal length of the post-rod combination and can be intermittently aligned to provide an airflow passage though this post-rod combination, upward movement of the post 14 causes these extensions to align and allows air in the environment surrounding the tube's distal end to enter and temporarily flow through the combination when liquid is being dispensed—thereby allowing the liquid to flow better from the container than it would if the container was otherwise vapor locked, and (c) since the hollow tube's exterior surface 22c has affixed to it a stopper 24 that has a configuration and orientation on the tube 22 adapted to plug the container's liquid dispensing orifice 10, upward movement of the post 14 also causes the stopper to move upward and unplug the cylinder's dispensing orifice—thereby allowing the quantity of liquid below the set height of the diaphragm to be dispensed.

A spring-loaded, thumb trigger 26 attached to the lid 4 is configured to provide the means for raising the coronal plane post 14 and its attached stopper 24 up so as to allow the volume of liquid below the disc diaphragm to be dispensed, and then to lower it so as to re-plug the cylinder's dispensing orifice when this desired volume of liquid has been dispensed.

Figure 2A:
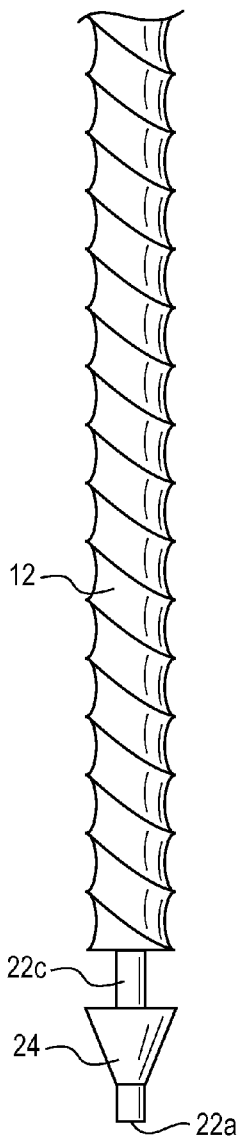
FIG. 2A is a partial front view of the bottom end of the post-rod combination shown in FIG. 1.

FIGS. 2A-2D provide more details of construction of the post-rod combination used in the present invention. FIG. 2A is a partial front view of the bottom end of this combination. The threaded rod is seen to be split along its longitudinal axis to yield approximately semi-circular-shaped front 12a and rear 12b portions in which the front portion has a rear-portion-facing planar surface at the location of the split and the rear portion has a front portion-facing planar surface at the location of the split.

Figure 2B:
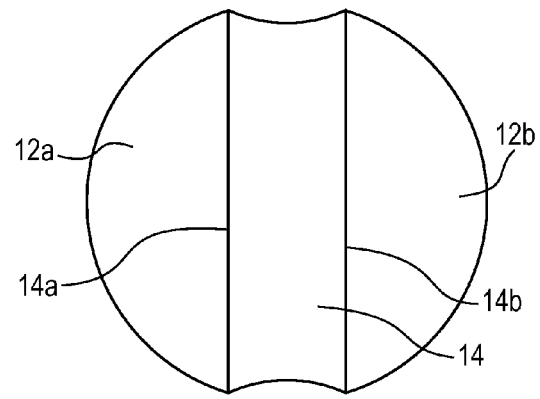
FIG. 2B is a top view of the post-rod combination shown in FIG. 2C.
Figure 2C:
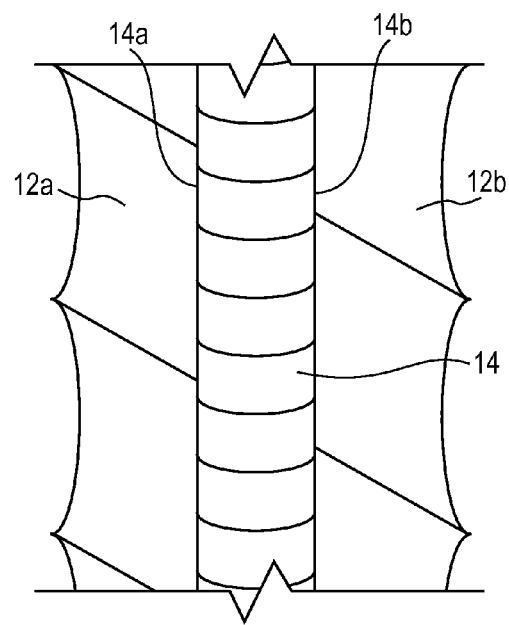
FIG. 2C is an enlarged view of a portion of the post-rod combination shown in FIG. 2A where the orientation of this view is 90 degree to the side of the view shown in FIG. 2A.

Only the front piece of the two part, approximately-semi-circular-shaped threaded rod 12 can be seen in FIG. 2A. The view shown is oriented such that the coronal plane post 14 and the other part of the threaded rod are lying directly behind the front threaded rod part that is shown. This is seen in the enlarged view that is shown in FIG. 2C where the orientation of this view is 90 degrees to the side of the view shown in FIG. 2A. The top view of FIG. 2C is shown in FIG. 2B.

The coronal plane post 14 is seen to have anterior 14a and posterior 14b planar surfaces, two concave shaped edges 14c and top and bottom ends that are separated by a coronal plane post length that is measured along the longitudinal axis of the post. The coronal plane post is placed between said threaded rod front and rear portions so that the coronal plane post's planar anterior surface 14a is in sliding contact with the rear-portion-facing planar surface of said threaded rod front portion and its posterior planar surface 14b is in sliding contact with the front-portion-facing planar surface of the threaded rod's rear portion. This post is mounted so that it can move up and down along the rod's longitudinal axis.

Figure 2D:
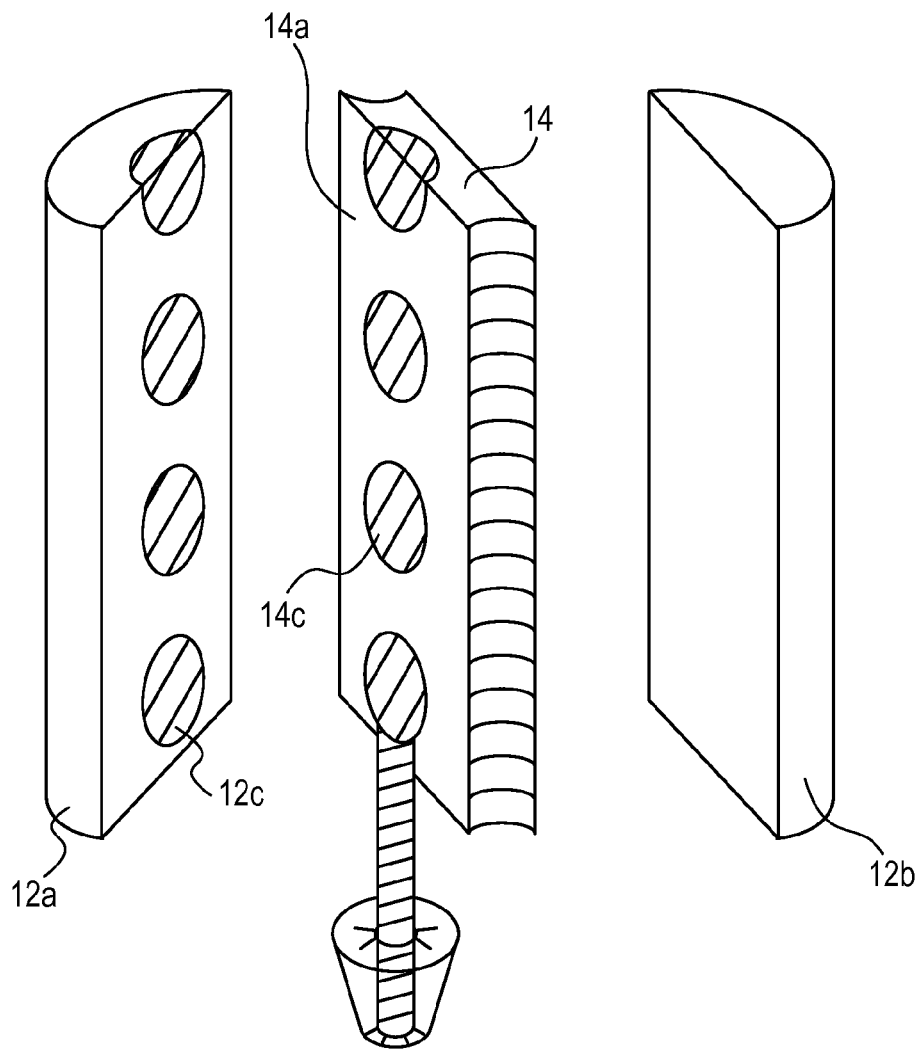
FIG. 2D is an exploded, partial front view of the bottom end of the post-rod combination shown in FIG. 2C.

FIG. 2D provides more information of this post-rod combination and how the post's hollow tube 22 is provided with an extension along the longitudinal length of the combination that provides for a temporary airflow passageway through the combination when its parts are properly aligned. A plurality of spaced-apart cavities are seen to be situated in one of planar surfaces of said coronal planar post (here they're shown in the anterior planar surface). A similar plurality of spaced-apart cavities 12c are also seen to be situated in the planar surface of the portion (i.e., the front portion) of the threaded rod 14 that is in sliding contact with the planar surface of the coronal plane post which has a plurality of spaced-apart cavities. The respective orientations of these cavities are such that when the coronal plane post slides up from its first position where its stopper is plugging the cylinder's liquid dispensing orifice a specified length to its second position where these spaced-apart cavities align so as to provide a temporary airflow passageway by which air may flow between the ends of the combination of the coronal plane post with the threaded rod front and rear portions when liquid is then dispensed from the cylinder due to its orifice having been unplugged by the rod and stopper's upward movement.

Figure 3A:
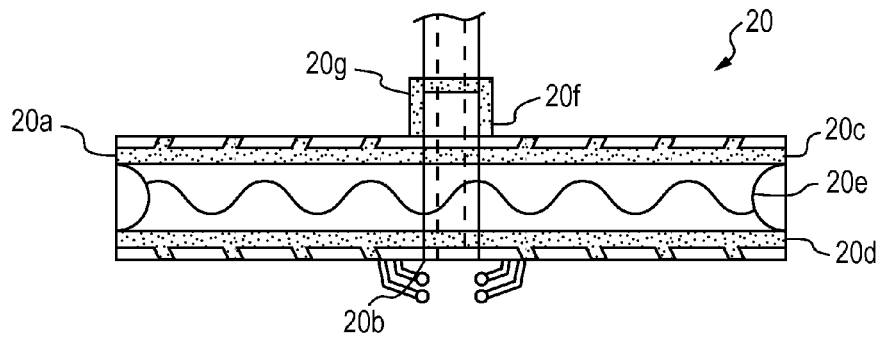
FIG. 3A is a front view of the disc diaphragm shown in FIG. 1.
Figure 3B:
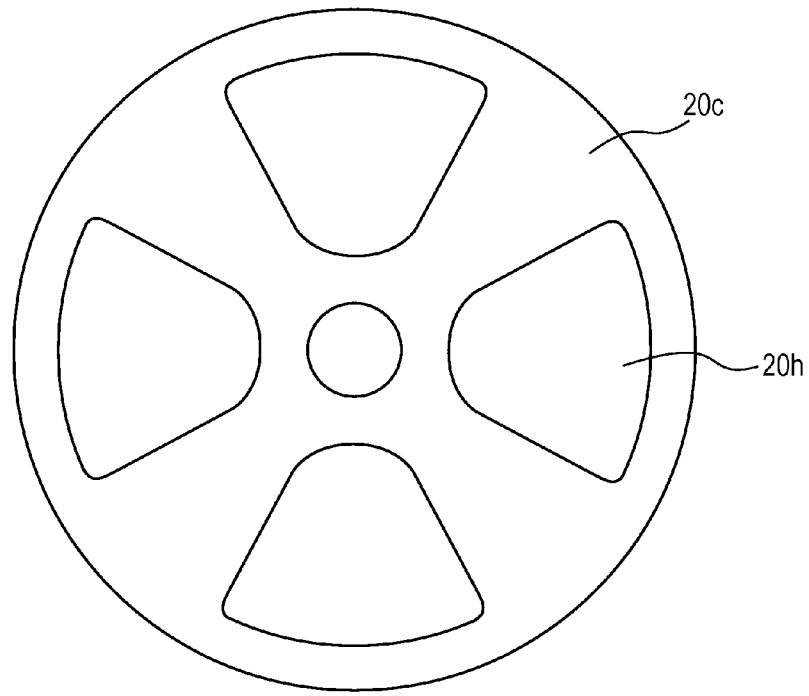
FIG. 3B is a top view of the top disc of the disc diaphragm shown in FIG. 3A.
Figure 3C:
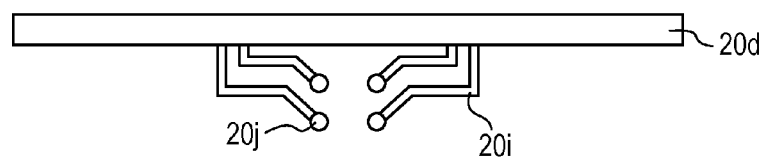
FIG. 3C is a side view of the bottom disc of the disc diaphragm shown in FIG. 3A.

FIGS. 3A-3C provide more details of construction of the disc diaphragm 20 used in the present invention. As shown in FIG. 3A, the diaphragm consists of longitudinally-spaced-apart top 20c and bottom 20d discs and a compressible intermediate disc member 20e whose rim surface 20a expands radially outward when the intermediate disc member is compressed so as to come into contact with the interior surface 2a of the cylinder so as to provide a temporary, liquid-tight seal between disc diaphragm and the cylinder's inner surface. Not shown in this view is a spring that separates the top and bottom discs. Its center orifice 20b and adjoining flange 20f on its top disc is used to allow it to be connected to the threaded rod 12. Ball bearings 20g in this flange fit into the diagonal thread of the threaded rod.

FIG. 3B shows a top view of a preferred embodiment of the top disc 20c. It has one or more openings 20h that when the discs are in their default positions, permit liquid to pass through the diaphragm as it is positioned up and down through the liquid within the cylinder. The bottom disc diaphragm has similar openings, but these are aligned such that the openings in the top and bottom disc never vertically line up with one another so that when these discs are brought together they form a solid surface that prevents liquid flow through the diaphragm.

FIG. 3C shows a side view of the bottom disc 20d. The bent legs 20i at the center and bottom of this disc have beaded tips 20j that fit into the concave grooves found in the side of the coronal plane post 14. The legs bend in one direction only, permitting the beads to glide over the threaded rod as the entire disc diaphragm rotates and moves up and down the threaded rod. The orientation of these legs is such as to always place some of these beads in the concave grooves of the coronal plane post in order to connect this bottom disc to the post so that it will also rise when the post is raised. To raise the post and the bottom disc of the diaphragm, a user presses downward on the thumb trigger 26.

Figure 4:
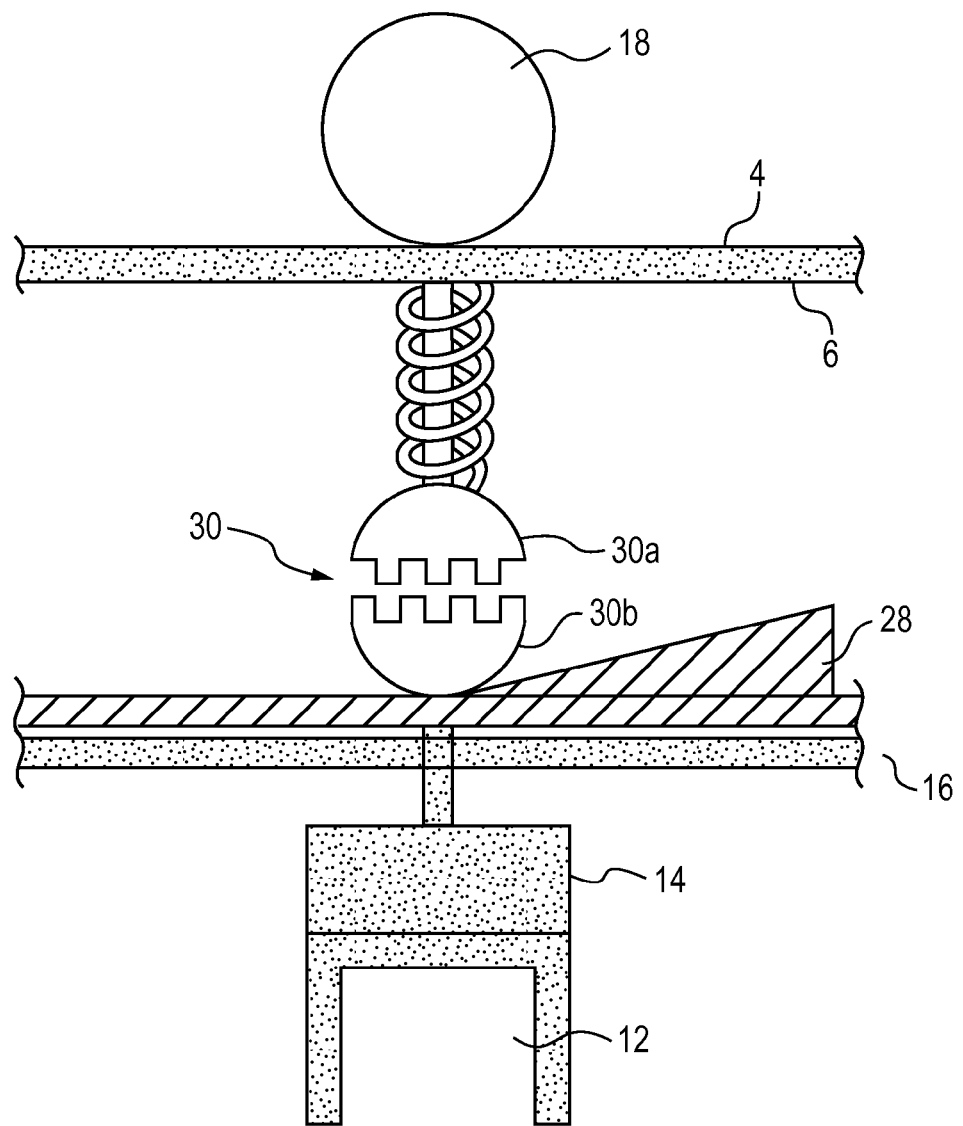
FIG. 4 is a partial, front view of the top part of the embodiment of the present invention shown in FIG. 1.

FIG. 4 provides a partial front view of the top part of the present invention in which can be seen the cylinder's lid 4 in its closed position and the mechanisms that connect the top part of the coronal plane post 14 to the connector 28 of the thumb trigger 26 and the two part, spherical linkage 30 which connects the airflow passageway of coronal plane post 14 to the air region in the top of the cylinder and the handle 18 which is used to rotate the threaded rod 12.

It can be seen that when the lid is opened, the linkage for the handle separates and then is rejoined when the lid is closed. The turning handle is one solid part with a shaft running through the lid surface, through the resistance spring, ending at the top portion 30a of the spherical linkage. Pulling up on the handle 18 meets resistance from the spring as well as creating an airflow passage though the spherical linkage 30. The coronal plane post 14 protrudes from the top of the threaded rod 12 with a portion extending through the plank 16 and through the sloping connector 28, culminating at the bottom portion 30b of the spherical linkage. The thumb trigger 26 is attached to the shorter height side of the sloping connector 28. As the thumb trigger is activated, the sloping connector slides to the left to raise the bottom portion 30b of the spherical linkage and the coronal plane post 14. In turn, the top portion 30a of the spherical linkage is pushed up against the resistance of the spring and, when the handle is pulled further up and rotated so as to misalign the linkage's teeth, an airflow passage is created that allows air from the ambient environment to enter the hollow tube's distal end 22a and rise through the post-rod combination and into the region of the cylinder beneath the lid.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that are set forth in the claims to the invention.

I claim:

1. A household, liquid storage device that is improved by modifying said device to also measure and dispense user-selected, specific volumes of said stored liquid, said device of the type having a container that has a top, open end, a closed, bottom end and a cylindrical interior wall that connects said ends, a lid that is attached to and covers said open end, and a longitudinal axis extending between said ends, the improvements to said device comprising:

a liquid dispensing orifice situated in the bottom end and on the longitudinal axis of said container, a multi-part, threaded rod combination having top and bottom ends, and a cylindrical outer surface that extends between said ends, said threaded rod combination being rotatably mounted on the longitudinal axis of said container so that the bottom end of said threaded rod combination extends through said liquid dispensing orifice and the top end of said threaded rod combination is detachably connected to said lid, a disc diaphragm having top and bottom surfaces, a cylindrical outer rim surface, and a center orifice that extends between said top and bottom surfaces and though which said threaded rod combination passes and about which said diaphragm is mounted perpendicular to the longitudinal axis of said container, wherein said diaphragm having a configuration adapted to attach said diaphragm to said threaded rod combination in such a manner that a user of said device can by the rotation of said threaded rod combination move said diaphragm up and down on said container longitudinal axis so as to situate said diaphragm at a user selected height above the bottom end of said container so that the volume of liquid below said diaphragm is equivalent to that of the liquid which said user has selected to dispense, and wherein said threaded rod combination having a configuration adapted to, by the upward movement for a specified distance of one of said parts of said multi-part, threaded rod combination: (a) provide a temporary airflow passage though said threaded rod combination that allows air from the ambient environment surrounding the bottom end of said threaded rod combination to enter said threaded rod combination and flow through said threaded rod combination to enter a region of said container that is above the level of the liquid in said container, and (b) cause said liquid dispensing orifice to go from a first state in which said orifice is plugged to a second state in which said orifice is unplugged so as to allow a user-selected and measured volume of liquid to be dispensed.

2. The improved, household, liquid storage device as recited in claim 1, further comprising:
a stopper affixed to the cylindrical, outer surface of said threaded rod combination and having a stopper outer surface with a configuration adapted to close and plug the liquid dispensing orifice of said container except when the threaded rod combination is caused to move upward a specified distance so as to temporarily unplug said container liquid dispensing orifice to allow a user selected volume of liquid to be dispensed.

3. The improved, household, liquid storage device as recited in claim 1, further comprising:
a trigger attached to the top end of said container and the threaded rod combination, and that has a configuration adapted to temporarily move upward through said specified distance said threaded rod combination upon the exertion of a defined force by said user on said trigger.

4. The improved, household, liquid storage device as recited in claim 2, further comprising:
a trigger attached to the top end of said container and the threaded rod combination, and that has a configuration adapted to temporarily move upward through said specified distance said threaded rod combination upon the exertion of a defined force by said user on said trigger.

5. The improved, household, liquid storage device as recited in claim 1, wherein:
said disc diaphragm including moveable, top and bottom discs that in their default positions which have a default position that longitudinally spaces apart said discs, and a compressible, intermediate disc member having a rim surface that expands radially outward, when said intermediate disc member is compressed by the action of said top and bottom discs being brought longitudinally together, so as to come into contact with and provide a liquid-tight seal with the cylindrical, interior wall of said container.

6. The improved, household, liquid storage device as recited in claim 2, wherein:
said disc diaphragm including moveable, top and bottom discs that in their default positions which have a default position that longitudinally spaces apart said discs, and a compressible, intermediate disc member having a rim surface that expands radially outward, when said intermediate disc member is compressed by the action of said top and bottom discs being brought longitudinally together, so as to come into contact with and provide a liquid-tight seal with the cylindrical, interior wall of said container.

7. The improved, household, liquid storage device as recited in claim 3, wherein:
said disc diaphragm including moveable, top and bottom discs that in their default positions which have a default position that longitudinally spaces apart said discs, and a compressible, intermediate disc member having a rim surface that expands radially outward, when said intermediate disc member is compressed by the action of said top and bottom discs being brought longitudinally together, so as to come into contact with and provide a liquid-tight seal with the cylindrical, interior wall of said container.

8. The improved, household, liquid storage device as recited in claim 4, wherein:
said disc diaphragm including moveable, top and bottom discs that in their default positions which have a default position that longitudinally spaces apart said discs, and a compressible, intermediate disc member having a rim surface that expands radially outward, when said intermediate disc member is compressed by the action of said top and bottom discs being brought longitudinally together, so as to come into contact with and provide a liquid-tight seal with the cylindrical, interior wall of said container.

9. The improved, household, liquid storage device as recited in claim 5, wherein:
said top and bottom discs having openings that are oriented so as to allow liquid to pass through said disc diaphragm when said discs are in their longitudinally-spaced-apart default positions, and prevent liquid from passing through said disc diaphragm when said top and bottom discs are brought together to compress said compressible, intermediate disc member and provide a liquid-tight seal with the cylindrical, interior wall of said container.

10. The improved, household, liquid storage device as recited in claim 8, wherein:
said top and bottom discs having openings that are oriented so as to allow liquid to pass through said disc diaphragm when said discs are in their longitudinally-spaced-apart default positions, and prevent liquid from passing through said disc diaphragm when said top and bottom discs are brought together to compress said compressible, intermediate disc member and provide a liquid-tight seal with the cylindrical, interior wall of said container.

11. The improved, household, liquid storage device as recited in claim 1, wherein:
said threaded rod combination having two, threaded rod parts, each of which has a cross-sectional shape that is approximately a semi-circle with a straight edge portion that serves to define a planar surface for said part that extends along the longitudinal axis of said container, and a coronal plane post part that has anterior and posterior planar surfaces and top and bottom ends, and wherein said coronal plane post part has a configuration adapted to allow said coronal plane post part to fit between and be longitudinally-slideably mounted between the planar surfaces of said threaded rod parts.

12. The improved, household, liquid storage device as recited in claim 2, wherein:
said threaded rod combination having two, threaded rod parts, each of which has a cross-sectional shape that is approximately a semi-circle with a straight edge portion that serves to define a planar surface for said part that extends along the longitudinal axis of said container, and a coronal plane post part that has anterior and posterior planar surfaces and top and bottom ends, and wherein said coronal plane post part has a configuration adapted to allow said coronal plane post part to fit between and be longitudinally-slideably mounted between the planar surfaces of said threaded rod parts.

13. The improved, household, liquid storage device as recited in claim 4, wherein:
said threaded rod combination having two, threaded rod parts, each of which has a cross-sectional shape that is approximately a semi-circle with a straight edge portion that serves to define a planar surface for said part that extends along the longitudinal axis of said container, and a coronal plane post part that has anterior and posterior planar surfaces and top and bottom ends, and wherein said coronal plane post part has a configuration adapted to allow said coronal plane post part to fit between and be longitudinally-slideably mounted between the planar surfaces of said threaded rod parts.

14. The improved, household, liquid storage device as recited in claim 8, wherein:

said threaded rod combination having two, threaded rod parts, each of which has a cross-sectional shape that is approximately a semi-circle with a straight edge portion that serves to define a planar surface for said part that extends along the longitudinal axis of said container, and a coronal plane post part that has anterior and posterior planar surfaces and top and bottom ends, and wherein said coronal plane post part has a configuration adapted to allow said coronal plane post part to fit between and be longitudinally-slideably mounted between the planar surfaces of said threaded rod parts.

15. The improved, household, liquid storage device as recited in claim 10, wherein:

said threaded rod combination having two, threaded rod parts, each of which has a cross-sectional shape that is approximately a semi-circle with a straight edge portion that serves to define a planar surface for said part that extends along the longitudinal axis of said container, and a coronal plane post part that has anterior and posterior planar surfaces and top and bottom ends, and wherein said coronal plane post part has a configuration adapted to allow said coronal plane post part to fit between and be longitudinally-slideably mounted between the planar surfaces of said threaded rod parts.

16. The improved, household, liquid storage device as recited in claim 11, wherein:

said coronal plane post part further having: (a) extending from the bottom end of said coronal plane post part, an open and closeable hollow tube with a distal end that passes through said liquid dispensing orifice and into the gaseous ambient environment surrounding the bottom end of said container, and (b) a first plurality of longitudinally-spaced-apart cavities located in one of the planar surfaces of said coronal plane post part, said planar surface of one of said threaded parts having located therein a second plurality of longitudinally-spaced-apart cavities, and wherein the locations of such first and pluralities of cavities are such that, when said coronal plane post part moves upward said specified distance, said cavities align so as to provide a temporary airflow passage though said threaded rod combination that allows air from the ambient environment surrounding the bottom end of said threaded rod combination to enter said hollow tube and flow through said threaded rod combination to enter a region of said container that is above the level of the liquid in said container.

17. The improved, household, liquid storage device as recited in claim 12, wherein:

said coronal plane post part further having: (a) extending from the bottom end of said coronal plane post part, an open and closeable hollow tube with a distal end that passes through said liquid dispensing orifice and into the gaseous ambient environment surrounding the bottom end of said container, and (b) a first plurality of longitudinally-spaced-apart cavities located in one of the planar surfaces of said coronal plane post part, said planar surface of one of said threaded parts having located therein a second plurality of longitudinally-spaced-apart cavities, and wherein the locations of such first and pluralities of cavities are such that, when said coronal plane post part moves upward said specified distance, said cavities align so as to provide a temporary airflow passage though said threaded rod combination that allows air from the ambient environment surrounding the bottom end of said threaded rod combination to enter said hollow tube and flow through said threaded rod combination to enter a region of said container that is above the level of the liquid in said container.

18. The improved, household, liquid storage device as recited in claim 13, wherein:

said coronal plane post part further having: (a) extending from the bottom end of said coronal plane post part, an open and closeable hollow tube with a distal end that passes through said liquid dispensing orifice and into the gaseous ambient environment surrounding the bottom end of said container, and (b) a first plurality of longitudinally-spaced-apart cavities located in one of the planar surfaces of said coronal plane post part, said planar surface of one of said threaded parts having located therein a second plurality of longitudinally-spaced-apart cavities, and wherein the locations of such first and pluralities of cavities are such that, when said coronal plane post part moves upward said specified distance, said cavities align so as to provide a temporary airflow passage though said threaded rod combination that allows air from the ambient environment surrounding the bottom end of said threaded rod combination to enter said hollow tube and flow through said threaded rod combination to enter a region of said container that is above the level of the liquid in said container.

19. The improved, household, liquid storage device as recited in claim 14, wherein:

said coronal plane post part further having: (a) extending from the bottom end of said coronal plane post part, an open and closeable hollow tube with a distal end that passes through said liquid dispensing orifice and into the gaseous ambient environment surrounding the bottom end of said container, and (b) a first plurality of longitudinally-spaced-apart cavities located in one of the planar surfaces of said coronal plane post part, said planar surface of one of said threaded parts having located therein a second plurality of longitudinally-spaced-apart cavities, and wherein the locations of such first and pluralities of cavities are such that, when said coronal plane post part moves upward said specified distance, said cavities align so as to provide a temporary airflow passage though said threaded rod combination that allows air from the ambient environment surrounding the bottom end of said threaded rod combination to enter said hollow tube and flow through said threaded rod combination to enter a region of said container that is above the level of the liquid in said container.

20. The improved, household, liquid storage device as recited in claim 15, wherein:

said coronal plane post part further having: (a) extending from the bottom end of said coronal plane post part, an open and closeable hollow tube with a distal end that passes through said liquid dispensing orifice and into the gaseous ambient environment surrounding the bottom end of said container, and (b) a first plurality of longitudinally-spaced-apart cavities located in one of the planar surfaces of said coronal plane post part, said planar surface of one of said threaded parts having located therein a second plurality of longitudinally-spaced-apart cavities, and wherein the locations of such first and pluralities of cavities are such that, when said coronal plane post part moves upward said specified distance, said cavities align so as to provide a temporary airflow passage though said threaded rod combination that allows air from the ambient environment surrounding the bottom end of said threaded rod combination to enter said hollow tube and flow through said threaded rod combination to enter a region of said container that is above the level of the liquid in said container.

\* \* \* \* \*